Feb. 21, 1956  W. STELZER  2,735,268
BOOSTER BRAKE MECHANISM
Filed Sept. 17, 1953   3 Sheets-Sheet 2
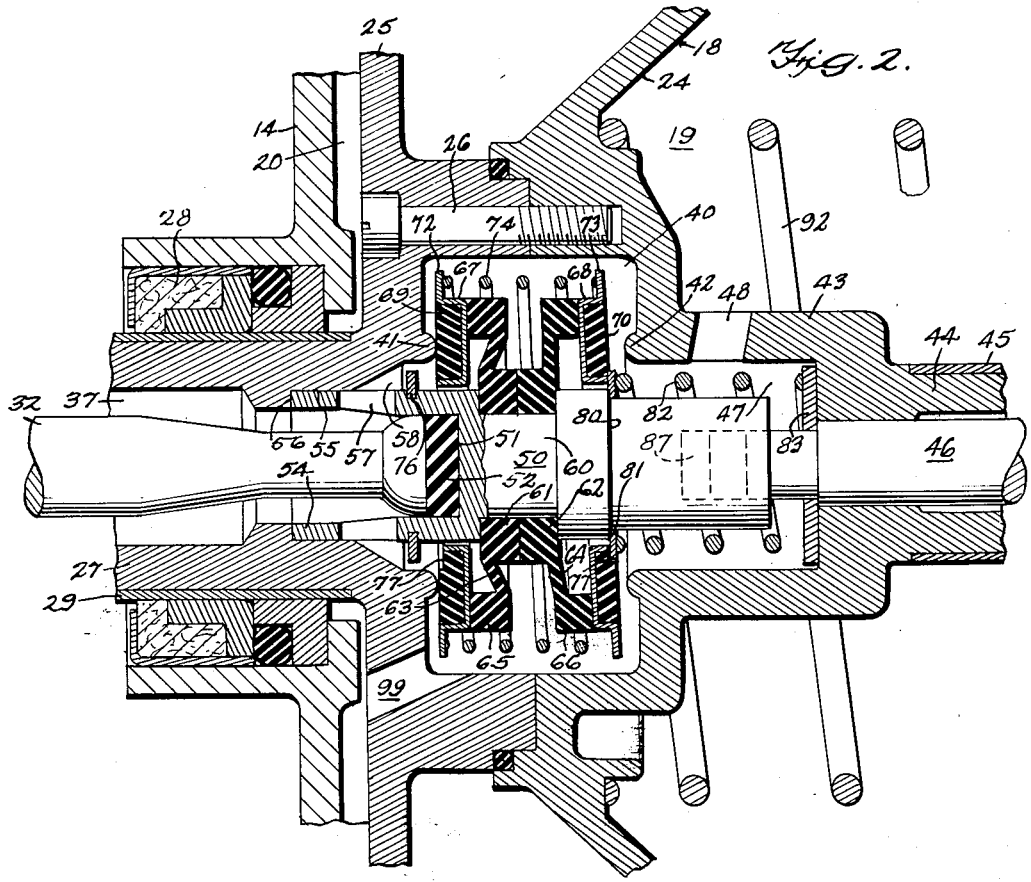
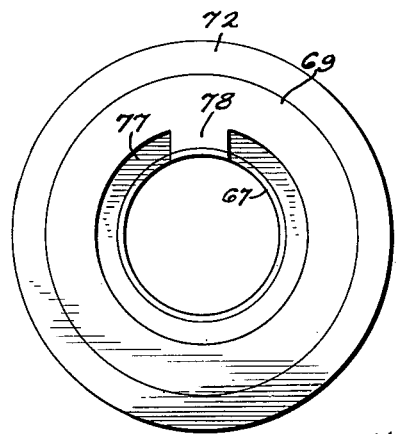
INVENTOR
WILLIAM STELZER
BY John F. Phillips
ATTORNEY Feb. 21, 1956

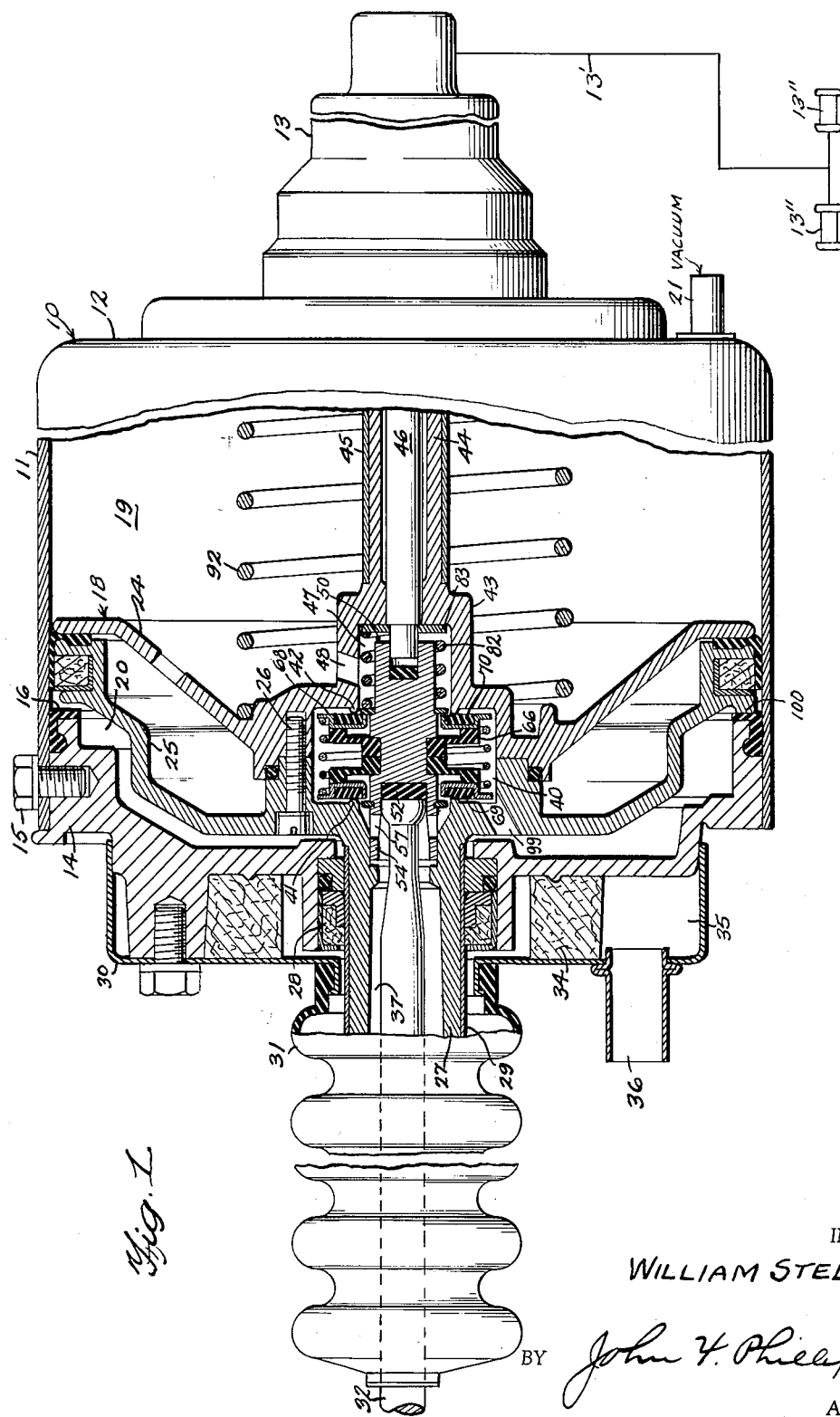

W. STELZER 2,735,268

BOOSTER BRAKE MECHANISM

Filed Sept. 17, 1953

INVENTOR
WILLIAM STELZER

BY John F. Phillips

ATTORNEY

United States Patent Office 2,735,268
Patented Feb. 21, 1956

2,735,268
BOOSTER BRAKE MECHANISM
William Stelzer, Summit, N. J.

Application September 17, 1953, Serial No. 380,754

16 Claims. (Cl. 60—54.6)

This invention relates to a booster brake mechanism for motor vehicles.

A present type of booster brake mechanism in common use combines as a unit the booster motor and the master cylinder, the motor having a pressure responsive unit connected to a fluid displacing sleeve extending into the master cylinder. Within the fluid displacing sleeve is a foot-operable fluid displacing plunger, and the pedal connections for operating the plunger are utilized, in conjunction with movement of the pressure responsive unit of the motor, for energizing the motor and causing the pressure responsive unit thereof and its fluid displacing sleeve to partake of a follow-up action relative to movements of the brake pedal.

One of the difficulties which has been encountered in this type of booster brake mechanism lies in the use of poppet valving for the follow-up control means. This type of valving, as is well known, tends to cause a "lumpy" operation because of the tendency of poppet valves to remain on their seats due to differential pressures acting thereagainst. Sleeve valves of course provide for smooth valve operation but are difficult to seal against leakage.

An important object of the present invention is to provide a booster mechanism having a control valve mechanism which is substantially statically balanced similar to a sleeve valve but which has the nonfriction and nonleak characteristics of a poppet valve, thus providing for the smooth operation of the brakes with a lack of "lumpiness" in the brake pedal.

A further object is to provide such a construction which employs valves for controlling higher and lower pressures and which valves are engageable with seats of the same diameter, thus making it possible to substantially pressure balance the valves.

A further object is to provide such a construction wherein the two valve units are identical, thus simplifying and rendering more economical the manufacture of the valve units.

A further object is to provide a novel association of valves and operating means therefor which cooperate with each other to further smooth out the valve operation by breaking such operation down into a plurality of steps.

A further object is to provide a booster mechanism of the character just referred to, wherein the "cracking" of the poppet valve for the higher pressure, instead of taking place directly axially, is accomplished by a tilting of the valve, thus greatly reducing the force necessary initially to open such valve.

Other objects and advantages of the invention will become apparent during the course of the following description.

In the drawings I have shown several embodiments of the invention. In this showing:

Figure 1 is an axial sectional view through a booster motor mechanism and associated parts, a portion of the master cylinder being illustrated and parts being shown in elevation, the valve parts being shown in lap position;

Figure 2 is an enlarged fragmentary sectional view of a portion of the pressure responsive unit of the motor and the valve mechanism, the valve parts being shown in a fully off position;

Figure 4 is a face view of one of the valve units;

Figure 3:
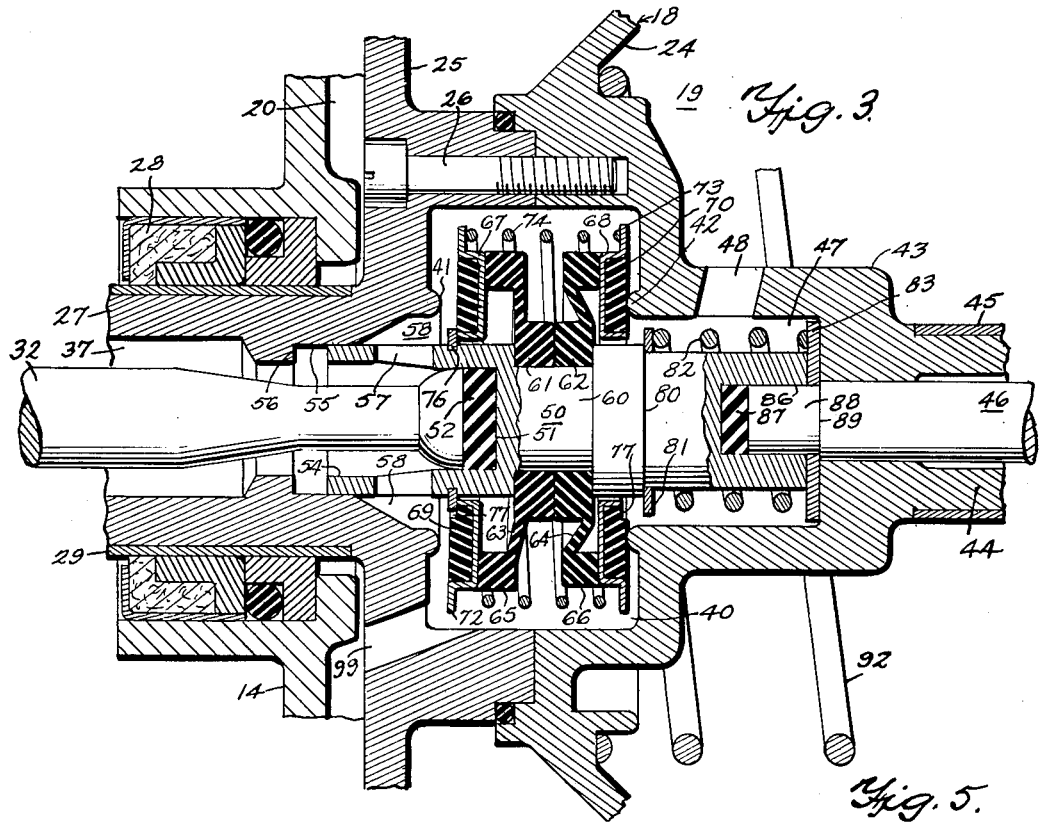
Figure 3 is a similar view with the valve parts shown in the fully brake-applied positions.

Referring particularly to Figure 1, the numeral 10 designates a booster motor as a whole comprising a preferably pressed-steel cylinder 11 having a closed end 12 to which is connected a master cylinder 13 of the type now conventional in booster brake mechanisms, the master cylinder having an outlet connected by lines 13' to the vehicle brake cylinders 13". The other end of the cylinder 11 is closed by a preferably die-cast head 14 secured to the cylinder 11 as at 15 and sealed with respect thereto as at 16.

A pressure responsive unit indicated as a whole by the numeral 18 is reciprocable in the cylinder 11. In the present instance the motor 10 is of the vacuum suspended type, and the unit 18 divides the cylinder 11 to form a constant pressure chamber 19 in which vacuum is always present, and a variable pressure chamber 20 in which vacuum is present, as described below, when the parts are in the off positions shown in Figure 1. A valve mechanism, to be described, controls the admission of air into the chamber 20 to operate the motor. For the purpose of connecting the chamber 19 with a source of vacuum, a nipple 21, carried by the cylinder end 12, communicates with the chamber 19 and is adapted for connection through a suitable pipe line to the intake manifold of the vehicle engine or other source of vacuum.

The unit 18 comprises a pair of sections 24 and 25 fitted to each other in leakproof engagement and secured together by screws, one of which is shown in Figure 1 and is indicated by the numeral 26. The section 25 carries an integral axially projecting sleeve 27 operable in suitable bearing and sealing means indicated as a whole by the numeral 28, the sleeve 27 preferably being surrounded by a relatively thin smooth stainless steel sleeve 29 which slides in the bearing and sealing means. A shell 30 is fitted over the end of the cylinder head 14, and connected thereto is one end of a rubber or similar boot 31 the other end of which is connected to a valve operating rod 32 of the usual type. The rod 32 has suitable mechanical connection with the vehicle brake pedal (not shown) to be moved toward the right in Figure 2 from the "off" pedal position, as will be apparent.

An air cleaner 34 is housed within the shell 30 and between this shell and the head 14. The air cleaner is annular, and to an annular space 35 around the air cleaner air is supplied through a nipple 36. After flowing through the air cleaner, the air flows into the interior of the boot 31, thence into the interior of the sleeve 27 in an annular space 37 surrounding the rod 32, and the admission of air into the motor is controlled by the valve mechanism described below.

The sections 24 and 25 of the pressure responsive unit cooperate to form a chamber 40. Opposite walls of this chamber, forming respectively parts of the sections 25 and 24, are provided with an air valve seat 41 and a vacuum valve seat 42, shaped as shown in Figure 2 and projecting slightly into the chamber 40. The vacuum valve seat 42 is at the left-hand end of a hub 43 formed integral with the section 24 as viewed in Figure 2, and this hub carries an integral axially projecting sleeve 44 preferably surrounded by a relatively thin stainless steel sleeve 45 slidable through suitable bearing and sealing means in the adjacent end of the master cylinder. The sleeve 44 accordingly forms a fluid displacing sleeve for the master cylinder, and within this sleeve is a cooperating fluid displacing plunger 46, pedal-operated through the medium of the rod 32 and associated elements in a manner to be described. Within the hub 43 is formed a chamber 47 in fixed communication through a port 48 with the vacuum motor chamber 19.

An axially movable spool member 50 is arranged in the pressure responsive unit 18. One end of this member is provided with an axial recess 51 in which is arranged a rubber or similar pad 52 engageable with the adjacent end of the rod 32 whereby movement of the latter toward the right in Figures 1, 2, and 3 will impart similar movement to the spool 50.

The end of the spool 50 in which the recess 51 is formed constitutes a hollow sleeve 54 slidable within a bearing surface 55 formed in the pressure responsive unit section 25, such bearing surface having an end shoulder 56 to limit movement of the spool 50 toward the left. The sleeve section 54 is provided with a port 57 through which air is adapted to flow from the annular space 37 to a chamber 58 within the air valve seat 41.

Intermediate its ends, the spool 50 is provided with a section 60 of reduced diameter, and between the shoulders at the ends of such reduced section are arranged resilient rings 61 and 62 integral with diaphragms 63 and 64. These diaphragms are integral with radially outer rings 65 and 66 respectively. The latter rings are bonded respectively to sheet metal cups 67 and 68 respectively carrying resilient valve elements 69 and 70. The element 69 is an air valve engageable with the seat 41 while the valve 70 is a vacuum valve engageable with the seat 42. The cups 67 and 68 are respectively provided with outstanding flanges 72 and 73 engaged by the ends of a relatively light compression spring 74. This spring obviously urges the valves 69 and 70 away from each other.

The spool 50, at the left of the air valve 69, is provided with a snap ring 76 engageable with the valve 69 and its cup 67 to move these elements toward the right when the brake pedal is depressed. The snap ring 76 may engage squarely against the adjacent valve unit to move it directly axially away from the seat 41. Preferably, for a reason to be described, initial movement of the valve 69 off its seat 41 takes place through an angular tilting of the valve 69. To this end, the valve 69 is provided adjacent the snap ring 76 with an annular groove 77 (Figure 4) which is broken at one side of the valve to provide a solid pad 78. The bottom of the groove 77 is flush with the adjacent flange of the cup 67, and the external diameter of the snap ring 76 is less than the maximum diameter of the groove 77. When the snap ring 76 moves toward the right, therefore, the portion of the snap ring adjacent the pad 78 will engage such portion of the air valve unit to tilt the valve 69 at one side thereof from the seat 41.

The right hand end of the spool 50 is reduced to form an annular shoulder 80 against which seats a vacuum-valve-operating washer or ring 81, maintained in position by a compression spring 82 in the chamber 47 and having its opposite end seating against a washer 83 at the opposite end of the chamber 47. The two valve units, including the valve elements and their associated diaphragms, etc., are preferably identical and, accordingly, the valve element 70 is also provided with a groove 77 similar to that shown in Figure 4 and described above. This groove receives the washer 81 so that this washer is moving the valve 70 from its seat 42 will tilt the valve 70 as shown in Figure 2 for "cracking" the valve 70 when the parts return to the normal "off" position.

The right-hand end of the spool 50 is provided with an axial recess 86 (Figure 3) in the bottom of which is arranged a resilient pad 87 engageable with the adjacent reduced end 88 of the plunger 46. The reduced end 88 is normally disengaged from the pad 87 as shown in Figure 1, and in dotted lines in Figure 2, but is engageable with the pad 87 under brake operating conditions described below, such contact being shown in Figure 3 in the fully brake applied positions of the parts. The reduced end 88 on the plunger 46 forms a shoulder 89 against which the washer 83 seats.

As previously stated, the motor in the present case is vacuum-suspended and, accordingly, the motor chambers 19 and 20 are in communication in the "off" positions of the parts. The pressure responsive unit is urged to such "off" position by a spring 92. Under such conditions, with the valve parts in the position shown in Figure 2, vacuum will be communicated from the motor chamber 19 through port 48 and chamber 47 to the chamber 40, the valve 70 being open. The chamber 40 is in fixed communication through a port 99 with the variable pressure chamber 20. In the "off" positions of the parts, movement of the pressure responsive unit 18 to the left is limited by engagement of peripheral bosses 100 on the section 25 with the sealing ring 16 (Figure 1).

Figure 6:
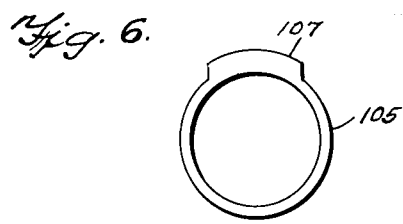
Figure 6 is a detail face view of a valve actuating washer used in the modified form of the invention in Figure 5.
Figure 5:
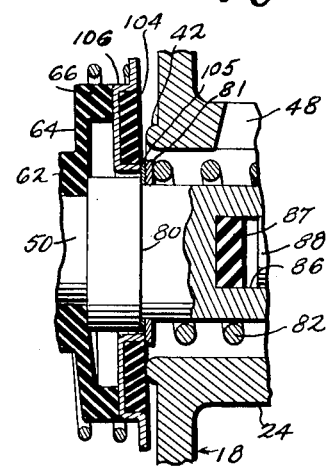
Figure 5 is a fragmentary sectional view of a portion of a modified type of valve mechanism.

A slightly modified type of valve unseating means is shown in Figures 5 and 6. Most of the parts in Figure 5 are identical with those previously described and need not be referred to in detail. A vacuum valve 104 is employed which is identical with the valve 70 except that it is not provided with the groove 77 previously described. Instead, a washer 105 is arranged between the washer 81 and the shoulder 80, and throughout the greater portion of its circumference, the external diameter of the washer 105 is smaller than the internal diameter of the inner flange of the cup 106 in which the valve 104 is arranged. At one side thereof, the washer 105 is radially enlarged as at 107 to provide a flange portion engageable with the vacuum valve unit to unseat one side of said unit from the vacuum valve seat 42, this unit initially rocking on the diametrically opposte side of such valve seat.

Figure 7:
Figure 7 is a perspective view of a further modified type of valve actuating washer.

In Figure 7 there is illustrated a modified type of ring 110 which may be used in place of the ring 76, the ring 110 having an offset portion 111 at one side thereof. Instead of forming the valve 69 with the groove 77, the open face of this valve may be flat throughout its area. When the ring 110 is used with such arrangement, the offset portion 111 will initially engage the valve 69 to first unseat one side of this valve from the air valve seat 41.

Operation

The parts normally occupy the positions shown in Figure 2, the valve 69 engaging the seat 41 and the valve 70 being disengaged from the seat 42 by the ring 81. It will be noted in Figure 2 that the valve 70 is slightly inclined from the vertical by virtue of the engagement of the bottom of the snap ring 76 in the groove 77 while the top of the snap ring engages the solid portion 78 of the valve. The purpose of this construction and operation will be referred to later.

In the "off" positions of the parts, vacuum will be present in both of the motor chambers 19 and 20. The chamber 19 is in fixed communication with the source of vacuum through the nipple 21 and associated piping, and accordingly vacuum is always present in the chamber 19. The chamber 47 is in fixed communication with the chamber 19 through port 48, while the chamber 58 to the left of the air valve is always in communication with the atmosphere through ports 57. In the "off" positions of the parts, the valve 69 closes communication between the chambers 58 and 40, and the latter chamber will be in communication with the chamber 19 around valve seat 42 and through chamber 47 and port 48. The chamber 40 is always in communication with the motor chamber 20 through port 99, and under the conditions referred to, the motor will be vacuum-suspended, since both motor chambers 19 and 20 will be connected to the source of vacuum.

To operate the brakes, the operator will depress the brake pedal (not shown) to effect movement of the rod 32 toward the right as viewed in Figures 1, 2 and 3. This movement effects movement of the spool 50 against the tension of the spring 82, thus moving the ring 81 toward the right. The valve 70 follows such movement by virtue of the spring 74 between the two valves. At the same time, the valve 69 will remain on its seat due to the lost motion between the snap ring 76 and the valve 69. Such initial movement of the brake pedal, therefore, will effect a lapping of the valves, as shown in Figure 1, both valves 69 and 70 now engaging their respective seats 41 and 42.

The next increment of movement of the brake pedal will then bring the snap ring 76 into engagement with the solid portion 78 of the valve 69, and this valve therefore will be "cracked" at one side, namely at the top as viewed in Figures 1, 2, and 3. Only the top of the valve 69 will be "cracked" since there will be no engagement of the snap ring 76 with the valve 69 throughout the arcuate length of the groove 77 (Figure 4). As stated, the purpose of this arrangement will be referred to later.

The valve 70 engages its seat 42 in the lap position of the parts as described, and further movement of the valve 70 toward the right will be arrested with the valve seated. Thus the chambers 40 and 47 will be disconnected, and the "cracking" of the valve 69 in the manner described will admit air into the chamber 40 and thence through port 99 into the motor chamber 20. Differential pressures thus will be established in the motor, and the pressure movable unit 18 will start to move toward the right. The valves obviously provide a follow-up action, since continued energization of the motor results in continued movement of the unit 18 toward the right together with the valve seat 42. If movement of the pedal is arrested, slight additional movement of the unit 18 will bring the valve seat 41 solidly into engagement with the valve 69, thus restoring the parts to the lap position shown in Figure 1.

Movement of the valve-operating parts initially takes place without imparting movement to the plunger 46 because of the lost motion provided between the rod end 88 and the cushion 87 as shown in Figures 1 and 5. However, movement of the pressure responsive unit 18 toward the right moves the power operated plunger 44 into the master cylinder 13 to displace fluid therefrom. The generation of pressure in the master cylinder reacts toward the left against the plunger 46 as viewed in Figures 1, 2, and 3, and play between the rod end 88 and pad 87 will be taken up as shown in Figure 3 and the reaction pressure will be communicated through the spool 50 to the rod 32 and thence to the brake pedal. Thus it will be apparent that initial movement of the brake pedal from "off" position encounters no resistance from the master cylinder but only the negligible resistances referred to below. However, since pressure is generated in the master cylinder, such pressure will react through the valve-operating elements, including the rod 32, to the brake pedal, thus providing the pedal with an accurate degree of "feel."

The space between the right-hand end of the spool 50 and the washer 83 will remain until a substantial brake application has occurred, the pressure responsive unit 18 running ahead of the spool 50 until such point is reached. During this period, the reaction felt by the operator through the pedal will be solely dependent upon master cylinder pressures acting on the plunger 46.

As motor energization approaches its maximum, pressure in the master cylinder will increase relative to energization of the motor, thus slowing down movement of the unit 18 but not of the manually operable elements. When a predetermined relatively high braking pressure is generated in the master cylinder, the parts will assume the positions shown in Figure 3. Beyond the point where the parts initially reach the position shown in Figure 3, the effort applied to the foot pedal will assist the motor in generating braking pressures since the right-hand end of the spool 50 will be solidly engaged with the washer 83, as will be apparent.

The parts will return to normal "off" positions upon the releasing of the brake pedal. When the latter operation is performed, the spring 82 will urge the spool 50 toward the left to move the valve 69 into engagement with the seat 41, the parts again returning to the lap position shown in Figure 1. Beyond this point, the spring 82 overrules the spring 74, thus moving the valve 70 from its seat 42, whereupon the parts will return to the fully "off" positions shown in Figure 2. Of course, the main return spring 92 of the motor moves the pressure responsive unit 18 to the "off" position of such unit as shown in Figures 1 and 2. This movement is cushioned and limited by engagement of the pads 100 (Figure 1) with the seal 16.

As previously stated, one of the features of the present invention is the provision of a valve mechanism which is substantially statically balanced similar to a sleeve valve, but which provides the frictionless nonleak characteristics of a poppet valve. In most fluid operated constructions, it is well known that appreciable force is necessary for the movement of poppet valves from their seats, and this condition is aggravated where relatively high differential pressures are involved. The present construction is highly advantageous in that it embodies functionally the advantageous characteristics of both poppet valves and sleeve valves.

Referring particularly to Figures 2 and 3, in which the valve and associated elements are shown substantially larger than in Figure 1, it will be noted that the internal diameters of the valve cups 67 and 68 are larger than the portions of the spool 50 which they surround. Therefore, the space within the diaphragm 63 is always under atmospheric pressure and the space within the diaphragm 64 is always under sub-atmospheric pressure, duplicating the pressure in the motor chamber 19. When the parts are in the positions shown in Figure 2, the left-hand area of the valve 69 within the seat 41 is under atmospheric pressure, and this pressure is duplicated at the opposite side of the valve cup 67. The portion of such side of the cup 67 within a circle concentric with the axis of the valve and corresponding in diameter to the valve seat 41 will balance the atmospheric pressure against the face of the valve 69 within the seat 41. The portion of the face of the valve 69 and the opposite face of the diaphragm 63 throughout the radial limits of the ring 65 thereof will be balanced since vacuum will affect both such areas. Opposite faces of the flange 72 will be similarly vacuum-balanced.

At this time it should be pointed out that the diaphragm 63 proper, under differential pressure forces, transmits such forces partly to the ring 65 and partly to the ring 61. This leaves only the pressure areas represented by the back face of the cup 67 and the diaphragm 63 between circles on these surfaces corresponding to the circle defined by the valve seat 41 and the circle defined by the inner surface of the ring 65. Atmospheric pressure back of the cup 67 substantially balances forces in these areas. The same analysis applies to the vacuum valve 70 and associated parts, except that vacuum is always present back of the valve cup 68. Accordingly, it will be apparent that as closely as it is possible to do so, the pressures affecting the valves and their associated diaphragms are always substantially balanced. It also may be pointed out that the valve assemblies are identical, and this obviously is advantageous since it makes for economy in manufacture. It also should be pointed out that the relative effective areas of the diaphragms can be increased by reduction in the diameter of the bead or flange 61 and in the inner diameter of the ring 65. The effective areas of the diaphragms can be reduced by increasing the diameters referred to.

The valve operating rings 76 and 81 are spaced apart a distance slightly greater than the spacing of the valves when the latter are in lap position to insure the tight seating of the valves in such position. The valve spring 74 is very light and serves to seat the valves and to prevent valve flutter. In the "off" positions of the parts, the vacuum valve is open, and the cut-in spring 82 moves the left-hand end of the spool 50 against the shoulder 56, as shown in Figure 2. When the pedal is depressed, the spring 74 first assists in the movement as it expands until the vacuum valve 70 is seated, and then offers slight resistance as it is compressed during the opening of the air valve 69. This produces a step-like increasing resistance due to the spring 74 which, however, is extremely light, as previously stated. The spring 82 is approximately four times as strong as the spring 74.

In order further to graduate the resistance of the spring 74, the recess 77 is provided in the face of each valve. In practice, this recess need be only about 1/64" deep, and accordingly, in unseating the respective valves, the rings 76 and 81 initially pick up their associated valve at one side only to give an initially reduced valve opening, under which conditions the spring 74 offers only one half its normal resistance. This gives a finer modulation, and the force exerted by the spring 74 is broken into five steps in moving from the fully "off" brake positions to the fully applied brake positions of the parts. These steps may be summarized as follows:

(1) In moving from the positions of the parts shown in Figure 2, the spool 50 moves toward the right and the spring 74 exerts its full force in assisting the manual operation of rod 32.

(2) When the valve 70 initially engages the seat 42, such engagement will take place solely at one side of the valve, namely at the bottom of Figure 2, because of the inclination of the valve incident to engagement of the collar 81 in the groove 77. From this point to the slightly later point in which the valve 70 engages throughout the circumference of the seat 42, the spring 74 will exert one half its force.

(3) When the valve 70 engages squarely against the seat 42, the lap position will be reached as shown in Figure 1, and momentarily the spring 74 exerts zero force.

(4) The snap ring 76 then picks up the valve 69 at one side thereof, the top of the collar as viewed in Figures 2 and 4 engaging the pad 78. From this point to the point at which the snap ring 76 engages the inner surface of the bottom of the groove 77, the valve 69 will be tilted to "crack" the valve from the seat 41, in which case only the top portion of the spring is effective and one half the force of this spring is encountered in pushing the rod 32.

(5) After the snap ring 76 engages the pad 78 and the inner surface of the bottom of the groove 77, movement of the rod 32 will move the valve 69 bodily from its seat with the parts in the positions shown in Figure 3, in which case the full force of the spring 74 will be transmitted through the valve 69 to oppose rod 32.

Therefore it will be apparent that while the forces encountered will not change precisely uniformly, the balancing of the pressures affecting the valves and the breaking-up of the resistance of the spring 74 into five steps greatly smooths out the operation of the parts and eliminates "lumpiness" in the operation of the brake pedal.

As stated above, the two valve units may be, and preferably are, identical, thus providing for economical manufacture of these units. The use of valve seats 41 and 42 of the same diameter permits the use of identical valve units and permits also the more accurate balancing of the pressures affecting the valves and their associated diaphragms. This in turn permits a combination of parts wherein substantially all of the advantages of poppet valves and sleeve valves are obtained, without the disadvantages of such valve devices.

It is to be understood that the structures shown and described are illustrative and that the invention is defined in the appended claims.

I claim:

1. In a booster brake mechanism having an expansible fluid chamber motor using differential fluid pressure as a source of power, a valve mechanism for directing fluid under pressure to and from said motor, said valve mechanism comprising a chamber, a pair of spaced concentric opposite openings in said chamber, one of said openings being connected to a source of pressure, the other of said openings being connected to a source of lower pressure, annular valve seats surrounding said openings, a manually movable member extending centrally through said openings and said chamber without closing said openings, a pair of valve disks within said chamber, resilient means to urge one valve disk to seat on one valve seat and the other disk on the other seat, each valve disk being movable on said member and having clearance therewith to communicate the fluid pressure in the opening to the back of the respective valve disk, each valve disk having an annular diaphragm with its inner periphery sealed on said member and its outer periphery sealed with and secured to said valve disk, means to limit the movement of said member, and shoulders on said member arranged to pick up one of said disks from its seat upon movement of said member after the other of said disks is seated.

2. The construction as claimed in claim 1 where the effective area of said diaphragm is so proportioned that the differential pressure acting on it counteracts the differential pressure acting on said valve disk.

3. The construction as claimed in claim 1 where said valve disks are of rubber-like material and are backed by metal reinforcements to keep them flat.

4. In a valve mechanism for a brake booster of the class described and using a fluid pressure operated motor, an opening communicating with a source of pressure, a second opening communicating with a source of lower pressure, a valve disk for one of said openings, a second valve disk for said second opening, resilient means to bias said disks into a closed position, means to unseat one of said disks at a time to establish communication between one of said sources and said motor, a diaphragm for each of said valve disks subjected to the same differential pressure as its respective disk and operatively connected to oppose and counteract the force of said differential pressure acting on said disk.

5. A booster brake mechanism comprising a master cylinder connectable with the brakes of a vehicle, a differential fluid pressure operated motor having a pressure responsive unit therein dividing it to form a constant pressure chamber and a variable pressure chamber, fluid displacing means extending into said master cylinder and connected to said pressure responsive unit, said pressure responsive unit having an internal control chamber, and a valve mechanism for controlling said motor comprising axially spaced annular valve seats of substantially equal diameter in the ends of such chamber and facing each other, a pair of valves engageable with the respective seats, a spring biasing said valves away from each other into engagement with said seats, said control chamber outwardly of said valves and said seats being in fixed communication with said variable pressure motor chamber, there being spaces within said seats communicating respectively with the atmosphere and with said constant pressure chamber and the latter chamber being adapted for connection with a source of vacuum, common operating means for selectively unseating said valves, and resilient means supporting said valves on said common operating means.

6. Apparatus constructed in accordance with claim 5 wherein said common operating means comprises a manually operable element mounted for axial movement in said pressure responsive unit and provided with a pair of spaced shoulders arranged at the remote sides of said valves and each engageable with a portion of one valve, said shoulders being spaced apart a distance greater than the spacing of said portions of said valves when both valves are seated, one shoulder being engageable with said portion of one valve upon movement of said element in one direction and the other shoulder being engageable with said portion of the other valve when said element is moved in the other direction whereby said valves may be selectively unseated.

7. Apparatus constructed in accordance with claim 5 wherein said common operating means comprises a manually operable element mounted for axial movement in said pressure responsive unit and provided with a pair of spaced shoulders arranged at the remote sides of said valves and each engageable with a portion of one valve, said shoulders being spaced apart a distance greater than the spacing of said portions of said valves when both valves are seated, one shoulder being engageable with said portion of one valve upon movement of said element in one direction and the other shoulder being engageable with said portion of the other valve when said element is moved in the other direction whereby said valves may be selectively unseated, said resilient means comprising a diaphragm connecting each valve to said manually operable element.

8. A booster brake mechanism comprising a master cylinder, a differential fluid pressure operated motor having a casing and a pressure responsive unit therein dividing said casing to form a constant pressure chamber and a variable pressure chamber and having a fluid displacing portion projecting into said master cylinder, means for connecting said constant pressure chamber to a source of pressure, said pressure responsive unit having a control chamber therein in constant communication with said variable pressure chamber and having an atmospheric pressure chamber in one end, and a differential pressure chamber in the other end communicating with said constant pressure chamber, said control chamber having valve seats in the ends thereof, a pair of valves in said control chamber respectively engageable with said valve seats, means axially movable in said pressure responsive unit for operating said valves, said axially movable means being movable in one direction to unseat one of said valves and in the other direction to unseat the other valve, and resilient means connecting each valve to said axially movable means.

9. A booster brake mechanism comprising a master cylinder, a differential fluid pressure operated motor having a casing and a pressure responsive unit therein dividing said casing to form a constant pressure chamber and a variable pressure chamber and having a fluid displacing portion projecting into said master cylinder, means for connecting said constant pressure chamber to a source of pressure, said pressure responsive unit having a control chamber therein in constant communication with said variable pressure chamber and having an atmospheric pressure chamber in one end, and a differential pressure chamber in the other end communicating with said constant pressure chamber, said control chamber having valve seats in the ends thereof, a pair of valves in said control chamber respectively engageable with said seats, an axially movable valve actuating member in said pressure responsive unit, a diaphragm connecting each valve to said valve actuating member, and a spring biasing said valves away from each other toward said seats, said valve actuating member having a pair of shoulders at the remote sides of said valves and respectively engageable therewith upon axial movement of said valve actuating member in opposite directions to unseat said valves.

10. Apparatus constructed in accordance with claim 9 wherein said diaphragms are annular and are provided with spaces therewithin communicating respectively with said atmospheric and differential pressure chambers, and wherein said valve seats are annular and of equal diameters, said valves and said diaphragms being identical whereby both valves and their associated diaphragms are subject to equal fluid pressures acting in opposite directions axially of said pressure responsive member.

11. Apparatus constructed in accordance with claim 9 wherein said diaphragms are annular and are provided with spaces therein communicating respectively with said atmospheric and differential pressure chambers, each valve and its diaphragm, when such valve is seated and the other valve is open, having substantially equal areas subject to pressures in said control chamber and in the space within such diaphragm.

12. Apparatus constructed in accordance with claim 9 wherein each shoulder and the adjacent valve are provided with portions at one side engageable with each other to unseat such side of each valve prior to the unseating of the valve as a whole.

13. A booster brake mechanism comprising a master cylinder, a differential fluid operated motor having a casing and a pressure responsive unit therein dividing said casing to form a constant pressure chamber and a variable pressure chamber the former of which is connectable to a source of pressure, said pressure responsive unit having a sleeve projecting into said master cylinder, a plunger slidable in said sleeve and cooperating therewith to form a fluid displacing unit movable into said master cylinder, said pressure responsive unit having an internal control chamber in fixed communication with said variable pressure chamber, said pressure responsive unit being further provided adjacent said constant pressure chamber with a differential pressure chamber communicating with said constant pressure chamber, said pressure responsive unit having an atmospheric chamber at the other end of said control chamber, oppositely facing valve seats in said control chamber respectively dividing said control chamber from said differential pressure chamber and said atmospheric chamber, a pair of valves in said control chamber respectively engageable with said seats, an actuating member for said valves slidable in said pressure responsive unit and provided with shoulders respectively engageable with said valves to unseat them upon movement of said member in opposite directions, a diaphragm connecting each valve to said member and sealing said control chamber from said atmospheric and differential pressure chambers, and a spring biasing said valves toward said seats, said plunger having lost motion connection with said valve actuating member and being in axial alinement therewith.

14. A booster brake mechanism comprising a master cylinder, a differential fluid pressure operated motor having a casing and a pressure responsive unit therein dividing said casing to form a constant pressure chamber and a variable pressure chamber and having a fluid displacing portion projecting into said master cylinder, means for connecting said constant pressure chamber to a source of pressure, said pressure responsive unit having a control chamber therein in constant communication with said variable pressure chamber and having an atmospheric pressure chamber in one end, and a differential pressure chamber in the other end communicating with said constant pressure chamber, said control chamber having valve seats in the ends thereof, a pair of valves in said control chamber respectively engageable with said valve seats, and means axially movable in said pressure responsive unit for operating said valves, said axially movable means having shoulders engageable with portions of the remote faces of the respective valves to unseat them, and said portions of said valves being at one side thereof whereby each shoulder unseats its associated valve by moving one side of such valve from its seat.

15. A booster brake mechanism comprising a master cylinder, a differential fluid pressure operated motor having a casing and a pressure responsive unit therein dividing said casing to form a constant pressure chamber and a variable pressure chamber and having a fluid displacing portion projecting into said master cylinder, means for connecting said constant pressure chamber to a source of pressure, said pressure responsive unit having a control chamber therein in constant communication with said variable pressure chamber and having an atmospheric pressure chamber in one end, and a differential pressure chamber in the other end communicating with said constant pressure chamber, said control chamber having valve seats in the ends thereof, a pair of valves in said control chamber respectively engageable with said valve seats, and means axially movable in said pressure responsive unit for operating said valves, said axially movable means being movable in one direction to unseat one of said valves and in the other direction to unseat the other valve, said axially movable means having a portion initially engageable with each valve, upon movement of said means, to first unseat such valve at one side thereof.

16. A booster brake mechanism comprising a master cylinder, a differential fluid pressure operated motor having a casing and a pressure responsive unit therein dividing said casing to form a constant pressure chamber and a variable pressure chamber and having a fluid displacing portion projecting into said master cylinder, means for connecting said constant pressure chamber to a source of pressure, said pressure responsive unit having a control chamber therein in constant communication with said variable pressure chamber and having an atmospheric pressure chamber in one end, and a differential pressure chamber in the other end communicating with said constant pressure chamber, said control chamber having valve seats in the ends thereof, a pair of valves in said control chamber respectively engageable with said valve seats, and means axially movable in said pressure responsive unit for operating said valves, each of said valves having its face remote from the other valve provided with an arcuate recess having ends terminating in a pad, and said axially movable means having collars at the remote sides of said valves each movable into engagement with one of said valves to unseat it and initially engageable with the pad of the associated valve to initially unseat the corresponding side of said valve.

No references cited.